United States Patent [19]
Halstead

[11] Patent Number: 5,186,246
[45] Date of Patent: Feb. 16, 1993

[54] EXTRUDED COOLANT/REFRIGERANT TANK WITH SEPARATE HEADERS

[75] Inventor: Gary A. Halstead, Lockport, N.Y.

[73] Assignee: General Motors Corporation, Detroit, Mich.

[21] Appl. No.: 891,067

[22] Filed: Jun. 1, 1992

[51] Int. Cl.$^5$ .............................................. F28D 7/16
[52] U.S. Cl. ..................................... 165/140; 165/173
[58] Field of Search .................. 165/41, 140, 153, 173, 165/176

[56] References Cited

U.S. PATENT DOCUMENTS

| | | | |
|---|---|---|---|
| 5,009,262 | 4/1991 | Halstead et al. | 165/140 |
| 5,069,277 | 12/1991 | Nakamura et al. | 165/173 |
| 5,076,354 | 12/1991 | Nishishita | 165/153 X |
| 5,092,398 | 3/1992 | Nishishita et al. | 165/153 |
| 5,107,926 | 4/1992 | Calleson | 165/173 |

Primary Examiner—Allen J. Flanigan
Attorney, Agent, or Firm—Ronald L. Phillips

[57] ABSTRACT

A combination radiator and condenser apparatus has a pair of tank and header assemblies adapted to be connected in both a coolant system for liquid cooled engine and a refrigerant system of an automobile air conditioning system. The assemblies each include a tank with two compartments separated by an internal partition which extends the full height of the tank. Each tank includes a slotted header for receiving the ends of a plurality of unitary extruded fluid flow tubes extending between each extruded tank and each of the unitary extruded fluid flow tubes have first and second passages therein connected respectively to the coolant chamber and the high pressure refrigerant chamber of each tank. Each tank includes a unitary tank extrusion and separate header assembly connected thereto. The tank extrusion includes a pair of side walls with the partition therebetween. A first embodiment of the header assembly includes two separate headers extending between the respective side wall and partition within grooves thereof. A second embodiment includes a single header extending between the side walls with a slot in the center to receive locking tabs extending from the partition.

3 Claims, 3 Drawing Sheets

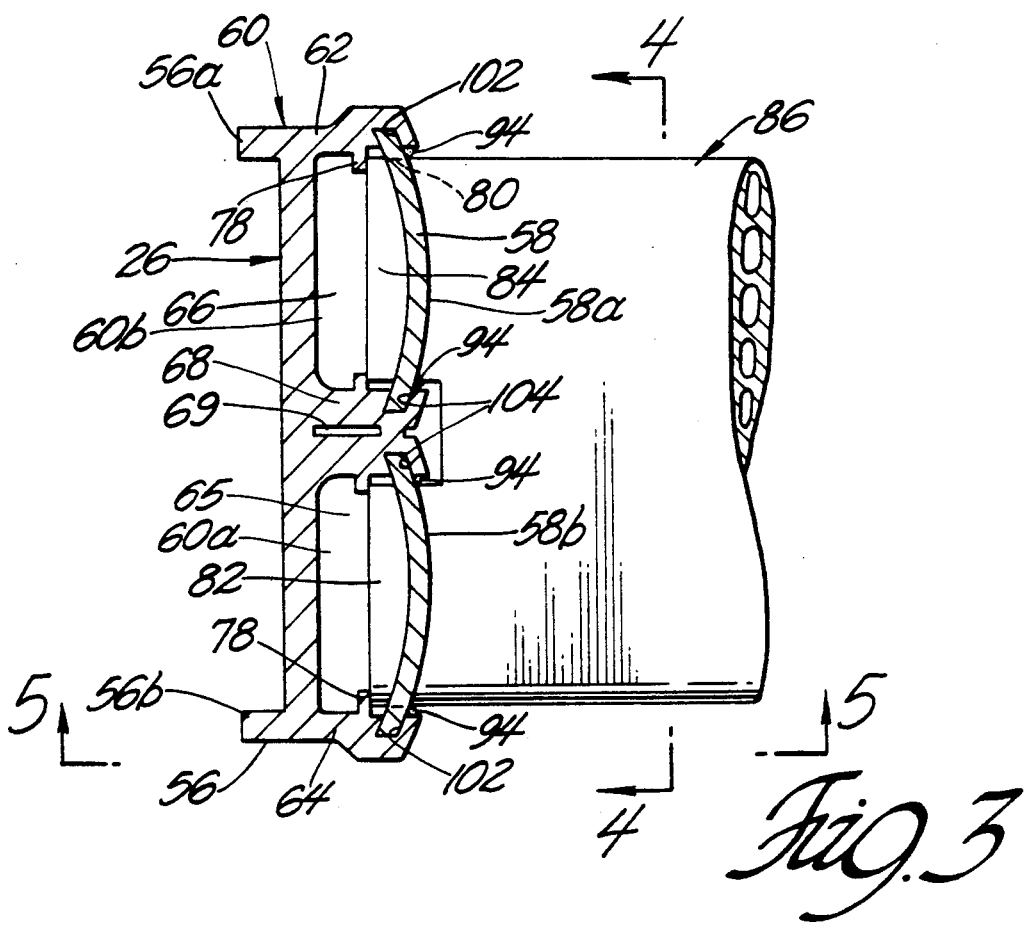

EXTRUDED COOLANT/REFRIGERANT TANK WITH SEPARATE HEADERS

TECHNICAL FIELD

The invention relates to an apparatus in a motor vehicle having a liquid cooled engine and an air conditioning system, and more particularly to a combination radiator and condenser apparatus having parallel tube passes of the type having air centers for directing the inlet air stream of the vehicle through the separate tube passes in separate radiator and condenser portions of the combination radiator and condenser apparatus.

BACKGROUND OF THE INVENTION

Motor vehicle cooling systems for cooling engine coolant, refrigerant vapor and transmission oil are known in which either an oil cooler or refrigerant condenser unit are located upstream from the cooling air inlet side of the radiator for heat from the coolant system for a liquid cooled engine. Such refrigerant condensers and oil coolers have separate air centers and the radiator has separate air centers.

In order to meet space and weight design constraints and inlet air stream flow patterns in a motor vehicle, a combined radiator and condenser apparatus has been utilized as disclosed in U.S. Pat. No. 5,009,262, issued Apr. 23, 1991 in the name of Halstead et al, and assigned to the assignee of the subject invention. The combination apparatus provides thin gauge aluminum centers which are common for both the radiator and condenser, and each of the radiator and condenser units share a common tank member and common header plates. An extruded tank has an integral internal partition and integral headers which separates the extruded tank into a coolant chamber and a high pressure refrigerant chamber. The tube passes of both the radiator and the condenser are bonded to an integral wall of the extruded tank at tube access slots therein. The tubes have the same air centers for defining a single air flow pass through both the radiator and the condenser. The integral headers construction is difficult to extrude to different thicknesses required to contain fluids under different pressures.

SUMMARY OF THE INVENTION

The invention includes a combination radiator and condenser apparatus for a motor vehicle having a plurality of parallel tube passes for cooling high pressure refrigerant vapor in an air conditioning system for the motor vehicle and for cooling engine coolant having air centers bonded thereto for cooling fluid flow through said parallel tube passes comprising. The parallel tube passes each include a flow tube with aligned segments forming a refrigerant passage and a separate coolant passage. A pair of tanks are included. The tanks include a coolant space communicating with the coolant passages for flow of coolant therethrough and a high pressure refrigerant space included for communicating the refrigerant passages with a mechanical refrigerant system for directing refrigerant vapor through the passages for condensation therein. Air center means is connected to each of the aligned flow tube segments for conductively transferring heat from the coolant and the refrigerant vapor. The tanks comprise tank extrusions and header means. The tank extrusions include a pair of side walls and a partition extending the length thereof to separate the coolant space from the high pressure refrigerant space. Separate headers are mounted adjacent the side walls and the partition to form the coolant space and the refrigerant space therebetween. The separate headers are separately formed to shapes and thicknesses required to contain fluids under different pressures, if required. Likewise, headers of the same shape and thickness are suitable for use with the invention. Bonding means is included for mechanically connecting the header means to the tank extrusion.

BRIEF DESCRIPTION OF THE DRAWINGS

Advantages of the present invention will be readily appreciated as the same becomes better understood by reference to the following detailed description when considered in connection with the accompanying drawings wherein:

FIG. 3 is an enlarged fragmentary sectional view taken along lines 3—3 of FIG. 2 looking in the direction of the arrows;

FIG. 4 is an enlarged fragmentary sectional view taken along lines 4—4 of FIGS. 3 and 6 looking in the direction of the arrows;

FIG. 5 is an enlarged fragmentary elevational view taken along lines 5—5 of FIG. 3 looking in the direction of the arrows;

DETAILED DESCRIPTION OF THE INVENTION

Figure 1:
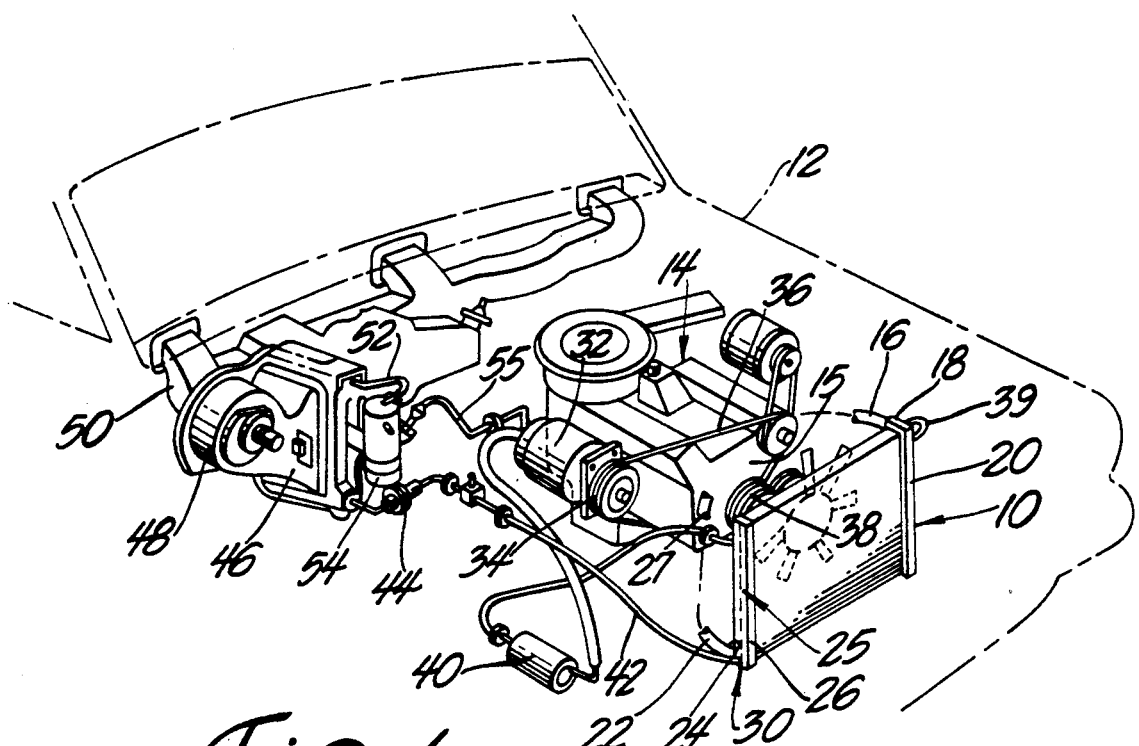
FIG. 1 is a perspective view of an automobile coolant system and air conditioning system including the combination radiator and condenser apparatus of the present invention.

Referring now to FIG. 1, a combination radiator and condenser apparatus 10 of the present invention is shown installed in the engine compartment of a motor vehicle 12 having a liquid cooled engine 14. A coolant pump 15 on the engine 14 directs liquid from the coolant passages of the engine for discharge through a radiator hose 16 which connects to an inlet fitting 18 on a radiator inlet tank 20 of the assembly 10. An outlet radiator hose 22 connects to an outlet fitting 24 on an outlet tank 26 and to the coolant jacket inlet 27. A radiator section 25 of the apparatus 10 is provided between the tanks 20 and 26. The radiator section 25 has a frontal flow area for unrestricted flow of the air intake stream.

The combination apparatus 10 includes a condenser section 30 which is connected to the discharge of a refrigerant compressor 32. The compressor 32 is driven through an electromagnetic clutch 34 by a belt 36 driven from an engine pulley 38 during engine operation. The compressor 32 discharges refrigerant at high pressure and in gaseous vapor form through a discharge line 39 containing a muffler 40 to the condenser section 30. The condenser section 30 has the same frontal flow area as that of the radiator section 25. The radiator section 25 and the condenser section 30 share the same air centers for preventing flow disturbances in the air intake stream of the vehicle across parallel tube passes and air centers therein to be described.

High pressure refrigerant vapor condenses in the condenser section 30 and the refrigerant exits the condenser section 30 at high pressure but in a liquid form through a high-pressure liquid line 42. The high pressure liquid line 42 is connected to a flow restrictor valve assembly 44 installed immediately upstream of an evaporator 46. Air is drawn through the evaporator on the air side thereof by an electric motor driven blower 48 and is blown at a reduced temperature into the passenger compartment through a mode control duct system 50.

Low pressure refrigerant vapor exits the evaporator 46 through a suction line 52 having an accumulator dehydrator unit 54 and is then returned to the suction inlet of the compressor 32 via line 55. U.S. Pat. No. 5,009,262, issued Apr. 23, 1991 in the name of Halstead et al, also assigned to the assignee of the subject application, is incorporated by reference herein and provides the basic structure of the apparatus 10 from which the subject invention provides modifications and subsequently discussed.

Figure 2:
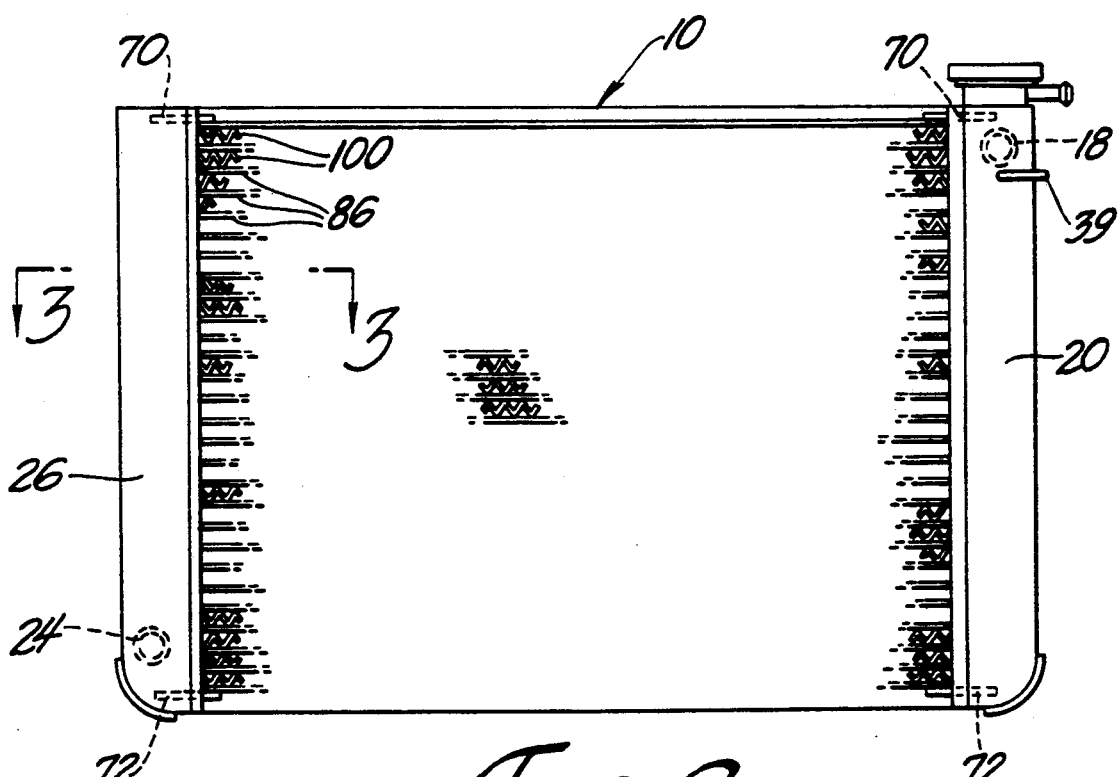
FIG. 2 is an enlarged front elevational view of the combination radiator and condenser apparatus of FIG. 1.
Figure 6:
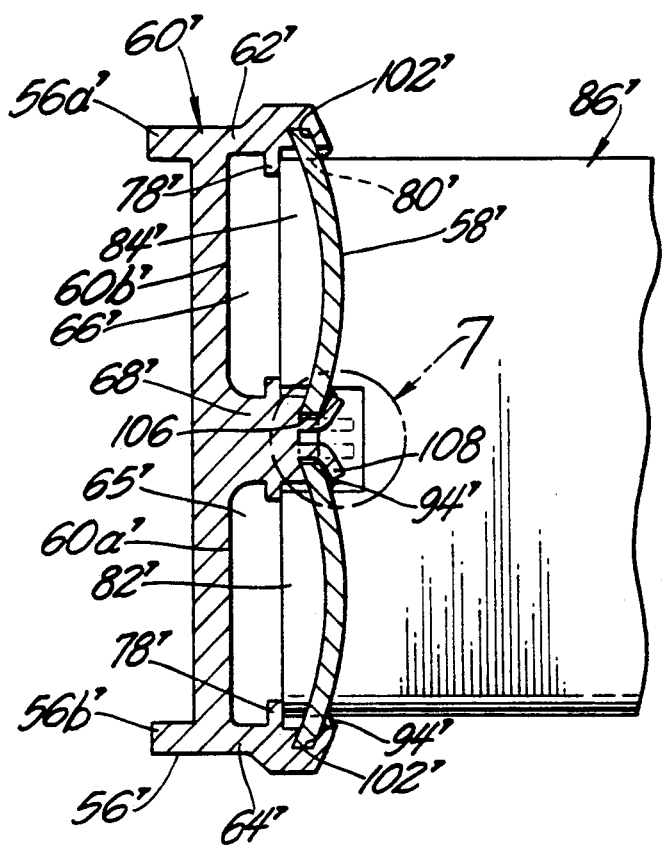
FIG. 6 is an enlarged fragmentary sectional view taken along lines 3—3 of FIG. 3 looking in the direction of the arrows of a second embodiment.

The inlet tank 20 and the outlet tank 26 are formed with multi-portions comprising an extrusion 60, 60' and header means 58, 58', as best illustrated in FIGS. 3 and 6. The extrusion 60, 60' has a mounting rail 56, 56' with side flanges 56a, 56a' and 56b, 56b'. The extrusion 60, 60' is connected and joined with the header means 58, 58' to form the tanks 20, 26. The mounting rail 56, 56' and the header means 58, 58' are common to both a radiator side 60a, 60a' and a condenser side 60b, 60b' of the extrusion 60, 60'. The mounting rail 56, 56' and header means 58, 58' extend in a compact space saving parallel relationship as seen in FIGS. 3 and 6. The rail 56, 56' and header means 58, 58' extend through the vertical height of the inlet and outlet tanks 20, 26 shown in FIG. 2. The extrusion 60, 60' has spaced integral side walls 62, 62', 64, 64' integrally joined to the mounting rail 56, 56' and connected to the header 58, 58' to form open ended coolant and high pressure refrigerant chambers or spaces 65, 65', 66, 66'. An integral internal partition 68, 68' divides the chambers 64, 66 and seals therebetween. The partition 68, 68' includes a separation 69, 69' dividing the partition 68, 68' into two halves to allow clinching of the header means 58, 58' with the extrusion 60, 60' upon brazing thereof. Furthermore, the separation 69 provides a thermal barrier to separate the coolant chamber 65, 65' from the refrigerant chamber 66, 66' to reduce heat conduction therebetween. End closures 70, 72 are directed through the header means 58, 58' at the top and bottom thereof to close the open ends of the chambers 65, 65', 66, 66'.

More specifically, the inlet fitting 18 and outlet fitting 24 are connected to the side walls 62 to communicate the coolant hoses 22, 24 with the coolant chambers 65, 65' in the inlet tank 20 and the outlet tank 26. The compressor discharge line 39 is connected by a refrigerant fitting to the side wall 64, 64' to communicate with the high pressure refrigerant chamber 66, 66' in inlet tank 20 and the high pressure liquid line is connected by a refrigerant fitting to the side wall 64, 64' to communicate with the refrigerant chamber 66, 66' in the outlet tank 26.

The side walls 62, 62', 64, 64' have internal integral tube stops 78, 78' therein and the headers 58, 58' have a plurality of spaced slots 80, 80' on either side of the divider partition 68, 68' so as to be aligned with the tube stops 78, 78'. The slots 80, 80' receive end extensions 82, 82', 84, 84' on either end of a common tube extrusion 86, 86' forming a tube pass between the inlet tank 20 and the outlet tank 26. The end extensions 82, 82', 84, 84' engage the tube stops 78, 78' to locate the end extensions 82, 82', 84, 84' in spaced relationship to the mounting rail 56, 56' so as to define a gap therebetween for smooth flow of fluid from the ports of the tube extrusion 86, 86' and the chambers 65, 65', 66, 66'.

As shown in FIG. 4, a common extruded tube 86, 86' is shown having a coolant flow portion 86a with a single coolant passage 86b. The tube 86, 86' has a refrigerant flow portion 86c with a plurality of separate refrigerant flow paths 86d separated by reinforcing webs formed integrally of the tube 86, 86'. The resultant structure defines a tube especially configured for use with a single air center and configured for reinforcing the high pressure refrigerant flow contained therein. However, separate air centers could be used for each of the radiator and condenser. The form of the tube extrusion 86, 86' may include any of the type set forth in the referenced patent. The tube extrusion 86, 86' has a surface 96, 96' including a leading edge 96a, 96a' which is aligned with the inlet air stream of the motor vehicle. The extrusions 86, 86' also have a trailing edge 96b, 96b' for discharge of the inlet air stream into the engine compartment of the vehicle after both high pressure refrigerant and engine coolant are cooled by the operation subsequentially described. The curved air flow surface 96 supports common air centers 100 for both the coolant flow and high pressure refrigerant flow. As illustrated in FIG. 5, the air centers 100 are sinusoidally curved sheet metal members with peaks and valleys bonded to the surface 96, 96' in conductive heat transfer relationship therewith for removing heat from the refrigerant flow paths 86d, 86d' during initial flow of the inlet air stream through the air center gaps 100a; the same air centers 100 cool the coolant in flow paths 86b, 86b' although separate air centers for the radiator and condenser can be used.

Alternatively, each of the common tube extrusions 86, 86' may have a plurality of flow paths therein each separated by a web which serve to reinforce the tube extrusion against high pressure refrigerant flow therethrough. Various configurations of the tube extrusions 86, 86' may be used, many of which are set forth in the referenced patent.

The tank extrusions 60, 60' include two embodiments thereof. The first embodiment 60 comprises a two-piece header 58, and the second embodiment 60' comprises a one-piece header 58'.

The first embodiment tank extrusion 60 with the two-piece separate header 58 is illustrated in FIG. 3. The two-piece header 58 comprises two individual, longitudinally extending headers 58a, 58b. Header 58b closes the coolant chamber 65 and header 58a closes the high pressure refrigerant chamber 66. The side walls 62, 64 include longitudinally extending grooves 102 extending the length of the side walls 62, 64, and the divider partition 68 includes on opposite sides thereof grooves 104 opposing the side wall grooves 102. The partition grooves 104 and side wall grooves 102 receive opposite edges on each of the headers 58a, 58b to form the chambers 65, 66 with the extrusion 60. The grooves 102, 104 are of a width to slideably receive the headers 58a, 58b while fixedly securing same. During assembly, the headers 58 are inserted within the grooves 102, 104, and mechanically clinched to hold the headers 58a, 58b in position during brazing thereof to form brazed joints 94 therebetween.

Figure 7:
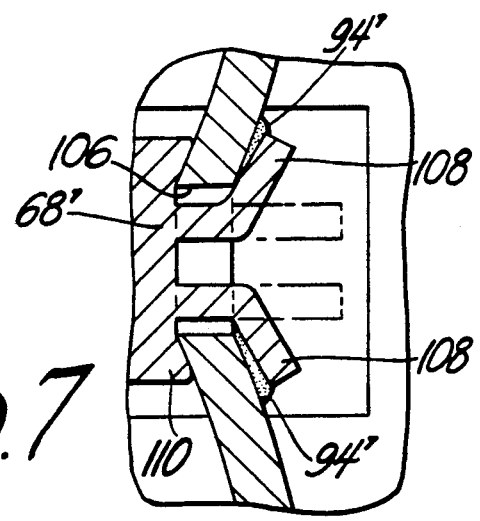
FIG. 7 is an enlarged fragmentary sectional view taken at line 7 in FIG. 6.
Figure 8:
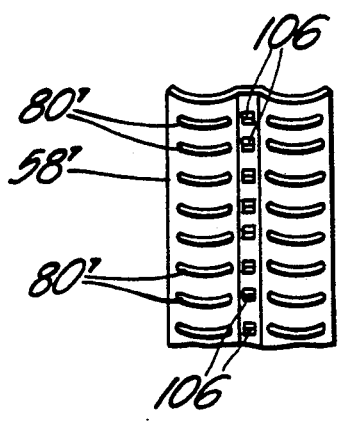
FIG. 8 is frontal sectional view of the header of FIG. 6.

The second embodiment 60' comprising the one-piece header 58' is illustrated in FIGS. 6 and 7. The one-piece header 58' comprises a single separate header 58' having a plurality of longitudinal slots 106 extending the height thereof, as best illustrated in FIG. 8. The divider partition 68' includes a plurality of pairs of spaced, deformable tabs 108 extending from the end 110 of the divider partition 68' for insertion into the slots 106. The tabs 108 are inserted within the header slots 106 upon assembly thereof as indicated in phantom in FIG. 6. The tabs 108 are thereafter deformed and clinched against the outer surface of header 58'. The tabs 108 and slots 106 extend for approximately 50% of the header width, extending approximately ½ inch long and spaced ½ inch apart. The side walls 62', 64' include the longitudinally extending grooves 102' as discussed in the first embodiment header 58. The header 58' is thereafter brazed to the extrusion 60' on the internal and external surfaces at 94' to seal therebetween.

Cladding material on the inside and outside surfaces of the headers 58, 58' serves to form brazed joints 94, 94' between the tube extensions 82, 82', 84, 84' and the headers 58, 58' at the openings 80, 80' therein to prevent header leakage at the tube extrusions 86, 86', and at the partition 68, 68' and side walls 62, 62', 64, 64'.

Operation of the embodiments of FIGS. 1–7 includes directing either fan induced or ram jet air as inlet air stream flow against the leading edges 96a of the tubes 86, 86'. The inlet air stream is passed across the flow surface 96 and through the common air centers 100 which are bonded to the surface 96 for simultaneously removing heat by conductive heat transfer through the same air center element from both the radiator section 25 and the condenser section 30. In the case of the radiator section 25, heat is removed from the coolant being circulated through the flow paths 86d by flow of coolant from the radiator inlet hose 16, through the inlet fitting 18, the coolant chamber 65 and into the radiator section of the outlet tank 26. From the tank 26, the return coolant passes through the outlet fitting 24 and the return radiator hose 22 to the coolant jacket inlet 27. Simultaneously, if the air conditioning is turned on the electromagnetic clutch 16 is energized by suitable control means of a conventional form well known in the art. The compressor 32 is thereby directly coupled to the engine output for compressing refrigerant vapor from the evaporator 46 and discharging the refrigerant vapor into the high pressure refrigerant vapor space 66. The refrigerant vapor is then passed through the tube pass 86 at the flow paths 86b therein where the vapor is cooled by direct conductive heat transfer to the common air centers 100 for extracting heat from the coolant in passages in flow paths 86b.

The conductive heat transfer for both coolant and refrigerant is from the tubes 86, 86' at the outer surface 96. The conductive heat transfer causes the high pressure refrigerant vapor to cool and condense into high pressure liquid which is collected and expanded across the expansion valve 44 for cooling the air flow across the evaporator 46.

Having described preferred embodiments of the combination condenser and radiator assembly of the present invention according to the present invention and in a particularly useful application thereof, it will be understood by those skilled in the art that the desired application and embodiments are obtained by a very compact arrangement of a few easily assembled parts which enable a combination assembly to be used either for air conditioning or non air conditioning applications. In such preferred constructions there is basically one common tube member which serves to flow both coolant and refrigerant at the same time if desired. But it will be understood by those skilled in the art that the above-described preferred embodiments are illustrative of the invention and may be modified within the scope of the appended claims.

What is claimed is:

1. A combination radiator and condenser apparatus for a motor vehicle having a plurality of parallel tube passes for cooling high pressure refrigerant vapor in an air conditioning system for the motor vehicle and for cooling engine coolant having air centers bonded thereto for cooling fluid flow through said parallel tube passes comprising:

said parallel tube passes each including a flow tube with aligned segments forming a refrigerant passage and a separate coolant passage;

a pair of tanks, said tanks including a coolant space communicating with said coolant passages for flow of coolant therethrough, and a high pressure refrigerant space for communicating said refrigerant passages with a mechanical refrigerant system for directing refrigerant vapor through said passages for condensation;

air center means connected to each of said aligned flow tube segments for conductively transferring heat from said coolant and said refrigerant vapor, each said tank comprising a unitary tank extrusion and two separate headers, said tank extrusion including a pair of side walls and a partition extending the length thereof to separate said coolant space from said high pressure refrigerant space, said separate headers having edges engaging said side walls and said partition to form said coolant space and said refrigerant space therebetween; and means for mechanically connecting said separate header at said edges to said tank extrusion.

2. An apparatus as set forth in claim 1 wherein said side walls include internal side grooves extending the length thereof for receiving said edges to secure said separate header to said tank extrusion.

3. An apparatus as set forth in claim 2 wherein said partition includes a pair of partition grooves opposing said side grooves, said header comprising two individual headers having side edges located within said side grooves and said partition grooves such that one header forms said coolant space with said tank extrusion and the other of said headers forms said high pressure refrigerant space with said tank extrusion.

* * * * *